(12) United States Patent
Ehlers (10) Patent No.: US 7,648,050 B1
(45) Date of Patent: Jan. 19, 2010

(54) FLUORIDE DISPENSER

(76) Inventor: Stacey Ehlers, 93 Carriage Crossing, Middletown, CT (US) 06457

( * ) Notice: Subject to any disclaimer, the term of this patent is extended or adjusted under 35 U.S.C. 154(b) by 272 days.

(21) Appl. No.: 11/000,440

(22) Filed: Nov. 29, 2004

(51) Int. Cl.
*B67D 5/08* (2006.01)

(52) U.S. Cl. ............. 222/129.4; 222/129.1; 222/144.5; 53/281

(58) Field of Classification Search ...... 222/129–129.4, 222/63, 144.5; 53/281
See application file for complete search history.

(56) References Cited

U.S. PATENT DOCUMENTS

| | | | |
|---|---|---|---|
| 4,815,633 A | | 3/1989 | Kondo et al. |
| 5,036,472 A | | 7/1991 | Buckley et al. |
| 5,237,910 A | | 8/1993 | Chigira |
| 5,431,201 A | * | 7/1995 | Torchia et al. ............. 141/98 |
| 5,685,435 A | | 11/1997 | Picioccio et al. |
| 5,758,571 A | | 6/1998 | Kateman et al. |
| 5,997,236 A | | 12/1999 | Picioccio et al. |
| 6,237,811 B1 | | 5/2001 | Ford |
| 6,308,494 B1 | * | 10/2001 | Yuyama et al. ............ 53/131.3 |
| 6,428,689 B1 | * | 8/2002 | Kameyama et al. ......... 210/120 |
| 6,615,880 B2 | | 9/2003 | Hewlitt et al. |
| 6,698,228 B2 | | 3/2004 | Kateman et al. |
| 6,759,072 B1 | | 7/2004 | Gutwein et al. |
| 6,892,941 B2 | * | 5/2005 | Rosenblum ................ 235/383 |
| 7,082,970 B2 | * | 8/2006 | Bartholomew et al. ...... 141/104 |
| 2002/0179639 A1 | * | 12/2002 | Bartholomew et al. ... 222/144.5 |
| 2003/0053963 A1 | * | 3/2003 | Pellicano et al. ............. 424/52 |
| 2003/0062385 A1 | * | 4/2003 | Engel et al. ................ 222/137 |
| 2003/0178444 A1 | * | 9/2003 | Brusowankin et al. ...... 222/192 |

FOREIGN PATENT DOCUMENTS

EP 0886249 12/1998

* cited by examiner

*Primary Examiner*—J. Casimer Jacyna
(74) *Attorney, Agent, or Firm*—Michael I Kroll (57) ABSTRACT

An apparatus for mixing and dispensing a fluoride treatment includes a housing having a storage container for separately storing a plurality of different flavored fluoride treatments and an input device for inputting a desired flavored fluoride treatment from one of the respective stored fluoride treatments in the storage container. In response to the input, the apparatus includes means for formulating said desired flavored fluoride treatment from said stored fluoride treatments. The apparatus further includes means for entering a volume of the desired flavored fluoride to be dispensed and means for dispensing the formulated desired fluoride treatment in a volume amount entered in said volume entering means to a user for later use thereof.

7 Claims, 11 Drawing Sheets

FLUORIDE DISPENSER

BACKGROUND OF THE INVENTION

1. Field of the Invention

The present invention relates generally to a dispensing device and, more specifically, to a fluoride dispenser that enables the user to select a flavor or combination of flavors creating a custom flavored fluoride to be dispensed.

Dental appointments are often difficult for both the patient and the practitioner. Many people, and adolescents in particular, have apprehension or fear when it comes to dental appointments. The patient's apprehension often results in increasing the length of the appointment costing the practitioner time and money.

Many practitioners use gimmicks and gifts such as stickers or toothbrushes to make the patient feel at ease. Additionally many treatment compositions come in various flavors to suit patient preferences. Such compositions include fluoride treatments. Many practitioners offer a variety of flavors of fluoride. It is often the case that a patient requests a mixture of 2 or more flavors. Such requests are often granted in order to please or reduce the apprehension of the patient. These requests also result in increasing the length of the appointment costing the practitioner time and money.

The fluoride dispensing device of the present invention provides means for pre-mixed custom flavored fluoride that suits the patient's needs and saves the practitioner time and money.

The dispensing device of the present invention is similar to a coffee vending machine in that it provides the patient with various choices of flavored fluoride. Once flavors are selected, the dispensing device determines the proper amount and ratios of each flavor to obtain the correct total volume. The container of custom flavor fluoride is sealed and dispensed and ready for the patient dental treatment.

The present invention's fluoride dispensing device allows for point of use formulation of custom flavored fluoride. The patient or end user is able to select the number of flavors and the volume ratio of each flavor providing for a custom flavor fluoride.

The present invention's fluoride dispensing device also allows for input by the practitioner. The owner or practitioner is able to define the number and type of flavors available and most importantly the total volume of fluoride to be dispensed.

The present invention's fluoride dispensing device also provides means for secured dispensing of the fluoride. The fluoride dispensing device with this feature would require the user to input a security code and/or ticket in order to activate the dispenser controls.

In a preferred method of use, the present invention's fluoride dispensing device would be available in the waiting room allowing the patient to formulate the flavored fluoride prior to the appointment. This method improves the efficiency of the appointment saving the practitioner money.

2. Description of the Prior Art

Numerous other dispensing devices and systems are designed for performing a similar purpose to that of the present invention. Typical of these is U.S. Pat. No. 4,815,633 issued to Kondo on Mar. 28, 1989.

Another patent was issued Buckley on Jul. 30, 1991 as U.S. Pat. No. 5,036,472. Yet another U.S. Pat. No. 5,237,910 was issued to Chigira on Aug. 24, 1993 and still yet another patent was issued on Nov. 11, 1997 to Picioccio as U.S. Pat. No. 5,685,435.

Another patent was issued to Kateman on Jun. 2, 1998 as U.S. Pat. No. 5,758,571. Additionally, U.S. Pat. No. 5,997,236 was issued to Picioccio on Dec. 7, 1999. Another patent was issued to Ford on May 29, 2001 as U.S. Pat. No. 6,237,811 and still yet another was issued on Mar. 2, 2004 to Kateman as U.S. Pat. No. 6,698,228. Another patent was issued to Gutwein on Jul. 6, 2004 as U.S. Pat. No. 6,759,072. Internationally, a European patent was issued on Oct. 30, 1997 as EP0886249.

U.S. Pat. No. 4,815,633

Inventor: Kondo, Ryohei

Issued: Mar. 28, 1989

Automatic regular coffee vending machine including ground coffee powders or coffee beans of different varieties stored in different chambers, separately. When one or more varieties are selected by selection-key operation, coffee powder or powders of the selected variety or varieties are supplied by a predetermined amount into a coffee extractor together with hot water of a predetermined amount, so that a cup of straight coffee of the selected variety or a cup of blended coffee of the selected varieties can be served from the machine. The coffee concentration can be selected by operation of concentration-selection keys, and coffee with cream and/or sugar also can be obtained by cream and/or sugar selection keys which are controlled by a memory storing data on the various supply amounts. When coffee beans are stored in the chambers, the selected amounts of beans are ground in a coffee mill before delivery to the coffee extractor.

U.S. Pat. No. 5,036,472

Inventor: Buckley, Stephen P.

Issued: Jul. 30, 1991

A machine for vending greeting cards or other personalized or customized products includes audio and video presentations of available products and options available to a customer, provisions for payment and apparatus for automatic delivery of products. Base products such as preprinted forms are stored for selective transfer by a robot device to modifying apparatus such as a printer, modified products being delivered to a delivery receptacle, all operations being under computer control and being changeable as desired for adding or substituting new forms of products.

U.S. Pat. No. 5,237,910

Inventor: Chigira, Noboru

Issued: Aug. 24, 1993

The material pack opening apparatus of the invention comprises: a pair of substantially parallel, spaced apart teeth shaped sting edges arranged in an front-to-end (longitudinal) direction; a transverse sting edges arranged perpendicular to, and at substantially intermediate position of, said paired sting edges; and a platform for holding thereon said sting edges, said apparatus enabling a material pack at the bottom of multiple packs each containing powder material and stacked on an article stock rack, to be cut open the bottom of the lowest material pack widely along two cut lines by pressing from above said packs, and, by vibrating said platform, enabling the bottom pack unpacked, freeing the powder material almost completely into a material accommodation unit in a short time.

U.S. Pat. No. 5,685,435

Inventor: Picioccio, John J.

Issued: Nov. 11, 1997

An automatic bulk vending machine is described including specific details as to various aspects of accurate volumetric dispensing, the separation of small broken pieces or fines from the dispensed product, and the easy and sanitary loading of such a machine. Further details as to how to provide a highly flexible selection process are provided. An automatic bulk vending machine according to the present invention may include a touch-screen for providing a visually entertaining and instructive display to guide a customer through the product selection process. Products to be selected may be stored in bins and volumetrically dispensed by a dispenser to a blending and holding pan. From this pan, they are then directed through a dispenser tube including a fines separator and collector to a dispensing cup. Bulk refill containers are also disclosed. Unlike an ordinary vending machine, the customer can choose the blend of product to be purchased. Unlike manual bulk vending, the automatic bulk vending machine is automatic and sanitary.

U.S. Pat. No. 5,758,571

Inventor: Kateman; Paul

Issued: Jun. 2, 1998

Apparatus for producing and dispensing an aerated product comprises a mixer which has a first inlet for receiving a fluid, a second inlet for receiving a gas, and an outlet. A relatively long continuous turbulence passage of relatively small cross section has one end positioned to receive the effluent from the mixer outlet and its other end spaced from the mixer outlet so that the effluent is subjected to confined turbulent mixing in the turbulence passage until the fluid product is discharged from the passage other end. If that product is to be cooled, the turbulence passage leads to a cooling area which cools and at least partially freezes the fluid product issuing from that passage. A method of producing the product is also disclosed. The invention has particular application to the making and dispensing of frozen yogurt and ice cream and allows for the service of individualized fresh portions in a variety of flavors and with little required cleaning.

U.S. Pat. No. 5,997,236

Inventor: Picioccio; John J.

Issued: Dec. 7, 1999

An automatic bulk vending machine is described including specific details as to various aspects of accurate volumetric dispensing, the separation of small broken pieces or fines from the dispensed product, and the easy and sanitary loading of such a machine. Further details as to how to provide a highly flexible selection process are provided. An automatic bulk vending machine according to the present invention may include a touch-screen for providing a visually entertaining and instructive display to guide a customer through the product selection process. Products to be selected may be stored in bins and volumetrically dispensed by a dispenser to a blending and holding pan. From this pan, they are then directed through a dispenser tube including a fines separator and collector to a dispensing cup. Bulk refill containers are also disclosed. Unlike an ordinary vending machine, the customer can choose the blend of product to be purchased. Unlike manual bulk vending, the automatic bulk vending machine is automatic and sanitary.

U.S. Pat. No. 6,237,811

Inventor: Ford; David F.

Issued: May 29, 2001

A programmable dispenser which mixes a substance with water and dispenses a product. In one embodiment, the rate at which substance is dispensed is programmable. The programmable dispenser includes a substance dispensing device which dispenses the substance and a motor which is operably connected to the substance dispensing device. A controller is operably connected to the motor and programmed to operate the motor at a programmed speed to dispense substance at a pre-determined rate. A button is in communication with the controller, and the controller is configured such that the button is actuatable to change the programmed speed to a new programmed speed to provide that the controller subsequently operates the motor at the new programmed speed to provide that the substance dispensing device dispenses substance at a different rate.

U.S. Pat. No. 6,615,880

Inventor: Hewlitt; Timothy

Issued: Sep. 9, 2003

A process is provided for the mixing of one or more concentrates in a machine, wherein one or more concentrates and/or one or more diluents are mixed together in a mixing chamber; and the product is dispensed from said machine into a storage container. A machine is also provided for the mixing of one or more concentrates, wherein said machine comprises one or more diluent sources and one or more concentrate sources, said diluent and concentrate sources being in fluid communication with one or more mixing chambers. Further, a process is provided for the simultaneous multiple mixing and dispensing of a plurality of products employing a machine comprising one or more diluent sources and one or more concentrate sources, said diluent and concentrate sources being in fluid communication with a plurality of mixing chambers.

U.S. Pat. No. 6,698,228

Inventor: Kateman, Paul

Issued: Mar. 2, 2004

Apparatus for dispensing a frozen or partially frozen food product has a freezing surface with a central axis and periphery, a motor for rotating the freezing surface about that axis, a turret spaced above the freezing surface for depositing a selected amount of liquid product mix on the freezing surface while it is rotating so that the liquid mix spreads out on the freezing surface and cools to form a flat, at least partially frozen product body and a product delivery assembly disposed between the turret and the freezing surface. That assembly includes a scraper supported above the freezing surface and having a working edge engaging the freezing surface while it is rotating to scrape the frozen product body into a ridge row of scraped product. A vertical forming cylinder positioned adjacent to the periphery of the freezing surface has a side window and a bottom opening. A scraper blade may push the row of product into the forming cylinder through the window thereby compacting the scrapings into a shaped solid body. An ejector in the cylinder pushes the shaped solid body out of the bottom opening into a container such as a cup or cone. A dispensing method is also disclosed.

U.S. Pat. No. 6,759,072

Inventor: Gutwein; Roger William

Issued: Jul. 6, 2004

System for making and delivering a customized beverage product to a consumer having a user interface, a customization director in communication with a customization data store and the user interface, wherein the customization director includes executable instructions for determining a user's customized formulation; and a beverage delivery system in communication with the customization director, wherein the beverage delivery system includes executable instructions for delivering a customized beverage product. Method for delivering a customized beverage product to an individual including the steps of obtaining consumer preference data; determining a consumer beverage formulation corresponding to the consumer preference data; and providing the consumer a customized beverage corresponding to the customized beverage formulation, utilizing one or more of delayed dilution, delayed mixing, and delayed filtering, in any order.

European Patent Number EP0886249

Inventor: Bodo, Mauro

Issued: Oct. 30, 1997

A device for dosing and preparing instant beverages for automatic and semiautomatic vending machines comprises at least one tank for containing dilutable substances provided with a dispensing outlet which is directed downwards and leads internally below the upper rim of an underlying open-top tray which has a preset volume and the bottom of which has at least one port for connection to a valve means for defining doses, which in turn leads into a device for mixing the doses with a diluent liquid.

While these dispensing devices may be suitable for the purposes for which they were designed, they would not be as suitable for the purposes of the present invention, as hereinafter described.

SUMMARY OF THE PRESENT INVENTION

A primary object of the present invention is to provide an apparatus that formulates custom flavors of fluoride.

Another object of the present invention is to provide an apparatus that formulates custom flavors of fluoride at point of use.

Still another object of the present invention is to provide an apparatus that allows a patient to formulate their own fluoride by providing several choices of flavors.

Another object of the present invention is to provide an apparatus that allows a patient to formulate their own fluoride by providing choices of different quantities or ratios of flavors.

Another object of the present invention is to provide an apparatus that allows an owner to determine the number of flavor choices to be dispensed.

Yet another object of the present invention is to provide an apparatus that allows for the owner to define the total volume of fluoride dispensed to the consumer.

Still yet another object of the present invention is to provide an apparatus that prevents unauthorized dispensing of fluoride.

Another object of the present invention is to provide an apparatus that dispenses custom flavors of fluoride that are pleasing to each individual user.

Yet another object of the present invention is to provide a fluoride dispensing apparatus that provides for more efficient and timely dental appointments.

Additional objects of the present invention will appear as the description proceeds.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the Figures illustrate the fluoride dispenser of the present invention. With regard to the reference numerals used, the following numbering is used throughout the various drawing Figures.

- 10 fluoride dispenser of the present invention
- 12 User/Patient
- 14 Fluoride Dispensing Device
- 16 Selector Panel
- 18 Hinge
- 20 Protective Screen
- 22 Capped and sealed custom flavored fluoride container
- 24 Receiving bay
- 26 Stand
- 28 Lock
- 30 first side
- 34 owner inputs
- 36 number of flavor selector
- 38 types selector
- 40 volume selector
- 42 user input options
- 44 flavor selector
- 46 ratio selector
- 50 single flavor
- 52 double flavor
- 54 triple flavor
- 56 four or more flavor
- 58 equal ratio selector
- 60 2:1 ratio selector
- 62 3:1 ratio selector
- 64 3:2:1 ratio selector
- 66 user defined ratio selector

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 11 illustrate the fluoride dispenser of the present invention which is indicated generally by the numeral 10.

In the dental field it is known that there is desirous to employ methods and mechanisms that minimize the amount of time a dentist spends easing patient apprehension. While patients are offered many gimmicks, flavored fluoride has become a standard. Requests for mixed fluoride flavors require a dentist to take time away from other patients to mix the requested flavors. There is a need for a device and system to reduce the amount of time spent on calming patients and increase the amount of time assisting them. The present invention aims to provide a system and apparatus including a fluoride dispenser which allows a user/patient to select preferred flavors or mix of flavors of fluoride to be automatically dispensed without consuming valuable time of the dentist.

Figure 1:
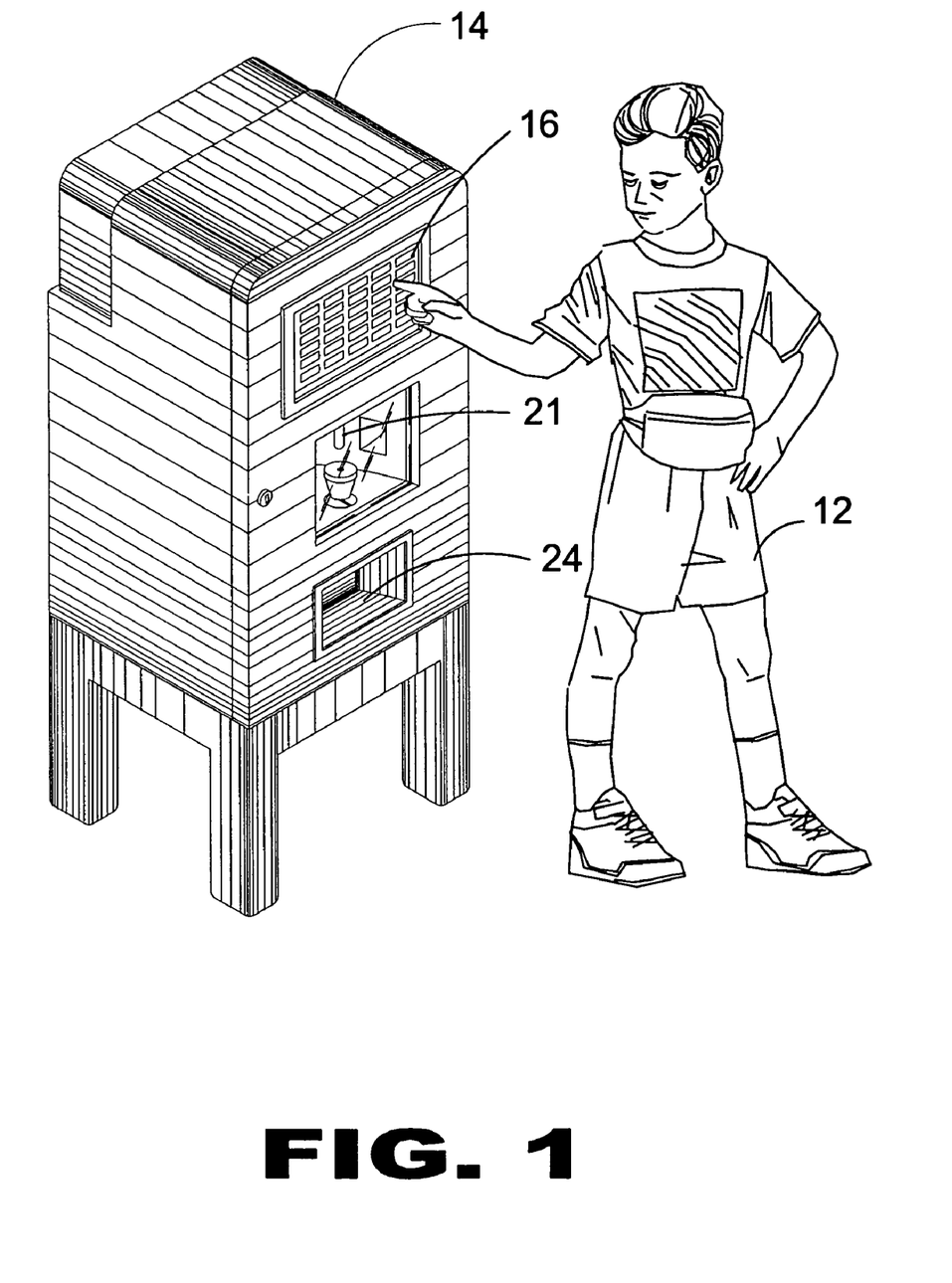
FIG. 1 is an illustrative view of the fluoride dispensing device of the present invention in use.

FIG. 1 is an illustrative view of the fluoride dispenser 10 of the present invention in use. The purpose of the fluoride dispenser 10 of the present invention is to provide an apparatus for dispensing pleasant tasting fluoride treatments for dental patients. It is known for dentists to utilized flavored fluoride treatments in order to make what is typically an uncomfortable procedure. These flavored fluoride treatments can be selectively mixed with one another to create additional flavored fluoride treatments. However, in order to mix flavored fluoride treatments together, the dentist or dental assistants must take time away from their patients to prepare the mixture. However, the fluoride dispenser 10 of the present invention allows a user 2 to selectively choose a flavor for a forthcoming fluoride treatment. The fluoride dispenser 10 includes a housing 14 having a storage receptacle (not shown) contained therein for storing at least one flavor of fluoride therein. Preferably, the storage receptacle is able to store a plurality of different flavored fluoride treatment therein. The housing 14 further includes a mixing mechanism for mixing together at least two different flavored fluoride treatments stored in the storage receptacle. The housing 14 also includes a selector panel 16 for selecting a desired fluoride flavor and a mechanism for dispensing 21 the selected fluoride stored therein.

At a predetermined time, the user 2 is able to select using selector 16 a desired flavor of fluoride. Alternatively, the user 2 is able to create a desired fluoride flavor by mixing at least two of the fluoride flavors stored in the storage receptacle. The predetermined time may include at least one of prior to a dental appointment and during a dental appointment. The selection process will be discussed hereinafter with specific reference to FIGS. 3 and 5-11.

Figure 2:
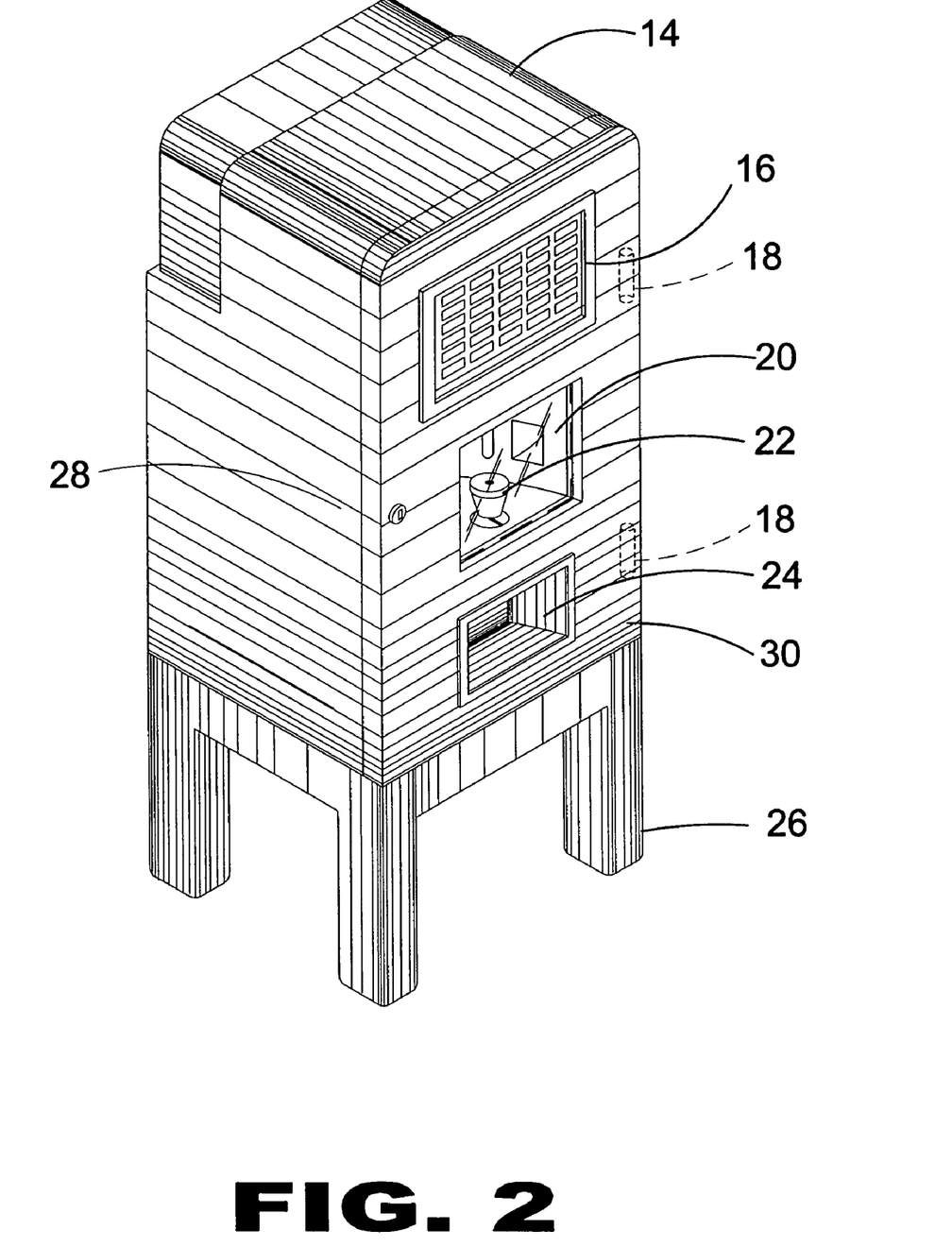
FIG. 2 is an illustrative view of the fluoride dispensing device of the present invention.

FIG. 2 is an illustrative view of the present inventions fluoride-dispensing device. The fluoride dispenser 10 includes the housing 14 equipped with the selector panel 16 allowing a user 12 can select their preferred fluoride flavors. The selector 16 is positioned on a face side 30 of the housing 14 which is pivotally connected to the housing body 31 by a plurality of hinges 18. A lock 28 is further included to prevent unauthorized access to at least one of the mixing mechanism, the storage receptacle and the dispensing mechanism 21. The housing 14 is a free standing structure positioned atop a stand 16. Alternatively, the housing 14 maybe be a tabletop housing selectively positionable on a counter or other flat surface.

Once the user 12 makes the selection the fluoride is at least one of dispensed by dispensing mechanism 21 and mixed and then dispensed by dispensing mechanism 21. The dispensed fluoride is received by a container 22 positioned thereunder. Preferably, the container 18 is selectively sealable in order to prevent unwanted contamination of the desired fluoride prior to application. The container 22 is automatically positioned behind a protective screen 20 to prevent interference and/or contamination of the fluoride during the at least one of mixing and dispensing process. Once the sealed custom flavored fluoride container 22 is filled, the container 22 is caused to be moved into the receiving bay 24 for user 12 pickup.

Figure 3:
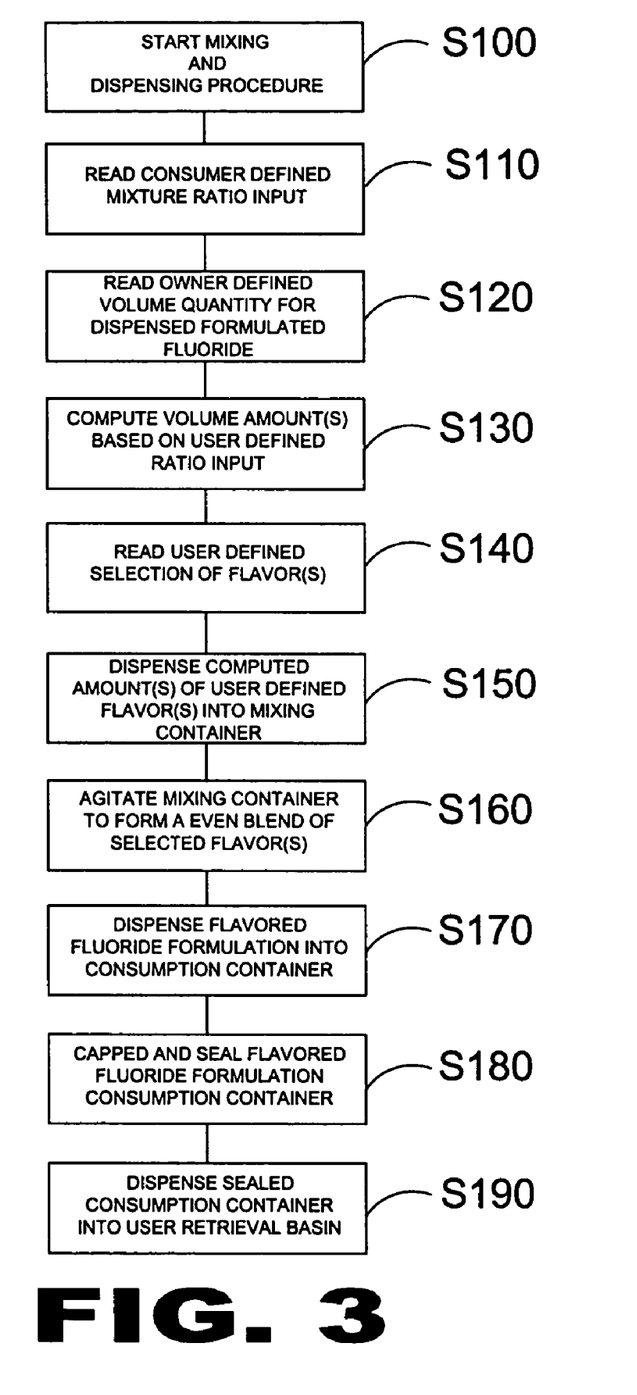
FIG. 3 a flow diagram describing the processing method for the fluoride dispensing device of the present invention.

FIG. 3 is a block diagram of the mixing and dispensing mechanism of the fluoride dispenser of the present invention. The procedure for mixing and dispensing fluoride from the fluoride dispenser 10 of the present invention begins in step S100. The selection process starts by reading the input from the user defining the mixture ratio they prefer, as illustrated in step S110. The system proceeds, in step S120, to read the owner defined volume quantity formulated fluoride previously chosen to be dispensed. Step S130 combines the ratio from step S110 and the total volume from step S120 to compute volume amounts of each respective flavor of fluoride to be mixed. The flavors defined by the user are then specified and read into the system in step S140. A mixing container is then filled with the dispensed computed amounts of user defined flavors, as in step S150. After being filled the mixing container is agitated to form an even blend of the selected flavors, as displayed in step 160. The flavored fluoride formulation is then dispensed in step S170 into a consumption container. Thereafter, in step S180, the flavored fluoride formulation consumption container is capped and sealed. The consumption container is now finished and is dispensed in the retrieval basin as shown in step S190.

Figure 4:
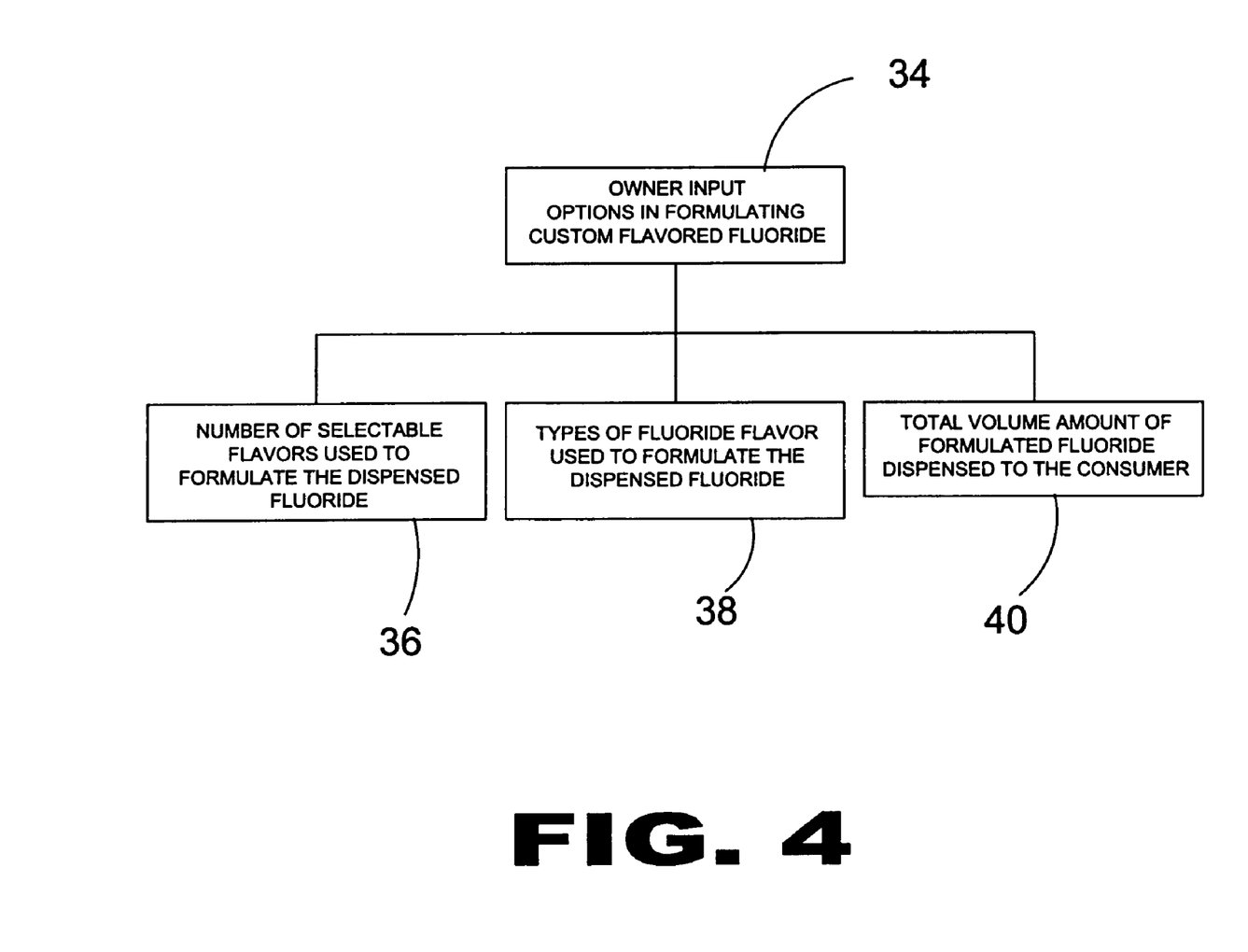
FIG. 4 a block diagram illustrating the owner input options for the fluoride dispensing device of the present invention.

FIG. 4 is a block diagram of the operator input options of the fluoride dispenser of the present invention. The fluoride dispense of the present invention includes a mechanism to formulate and dispense custom flavored fluoride to a user/patient. The fluoride dispenser includes an owner input 36 whereby, in order to set the system, the owner inputs options for formulating custom flavored fluoride. The owner input allows for a plurality of settings to be selectively choosen by the owner. The fluoride dispenser includes a flavor selector 36 connected to the owner input 34 whereby the owner can input the number of selectable flavors used to formulate the dispensed fluoride. The owner can specify the types of fluoride used to formulate the dispensed fluoride using a type selector 38. Additionally, the owner is able to selectively set the total amount of formulated fluoride dispensed to user using volume selector 40.

Figure 5:
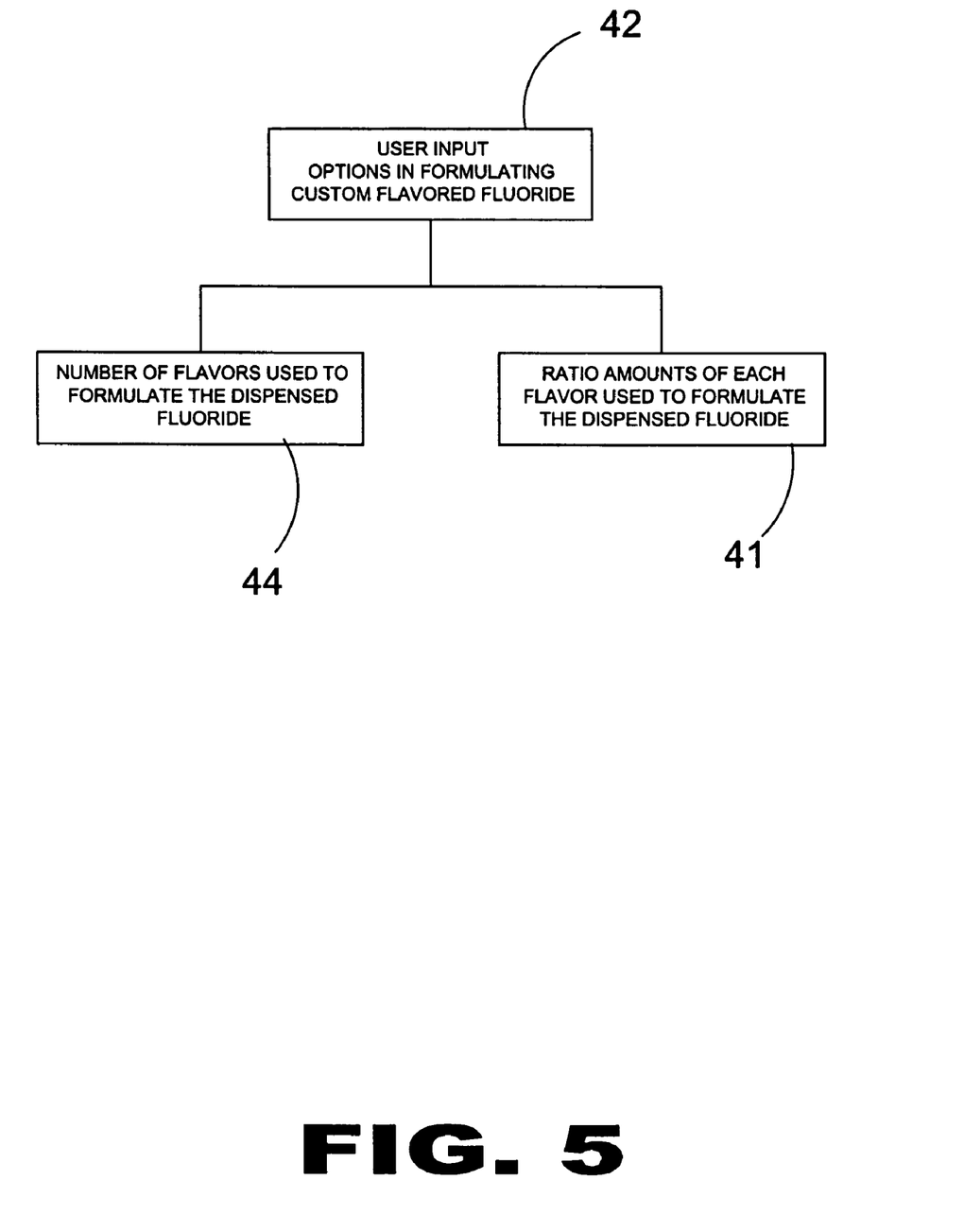
FIG. 5 a block diagram illustrating the consumer input options for the fluoride dispensing device of the present invention.

FIG. 5 is a block diagram of the user input selector 42 of the fluoride dispenser 10 of the present invention. The user input selector 42 allows the user to selectively determine the flavors and amounts of each flavor to be used to produce a unique fluoride flavor. The user input selector 42 includes a flavor combination selector 44 which allows the user to selectively determine the number of different fluoride flavors to be used when making the unique fluoride combination. A ratio selector 46 is also connected to the user input selector 42 and allows the user to selectively determine the ratio of each of the selected number of flavors to be used when making the unique fluoride combination.

Figure 6:
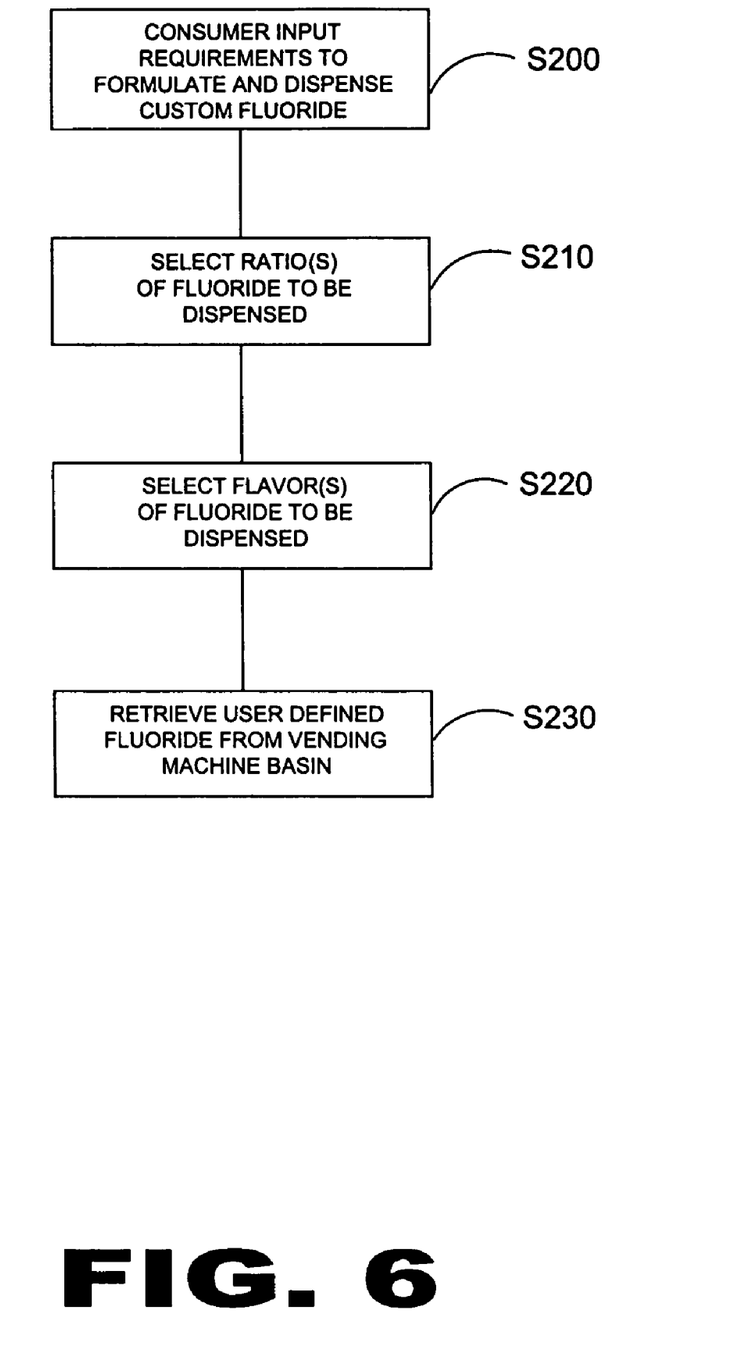
FIG. 6 a flow diagram illustrating the consumer input options for the fluoride dispensing device of the present invention.

FIG. 6 a flow diagram illustrating the consumer input options for the fluoride dispensing device of the present invention. When making a selection the consumer must input options to formulate custom flavored fluoride, as shown in step S200. Firstly, in step S210, the user selects the ratios of each flavor of fluoride to be at least one of mixed and dispensed. Secondly, as shown in step S220, the user selects the flavors of fluoride to be dispensed. Thereafter, the user is done with the input process and can retrieve the user defined fluoride from the vending machine basin, as shown in step S230.

Figure 7:
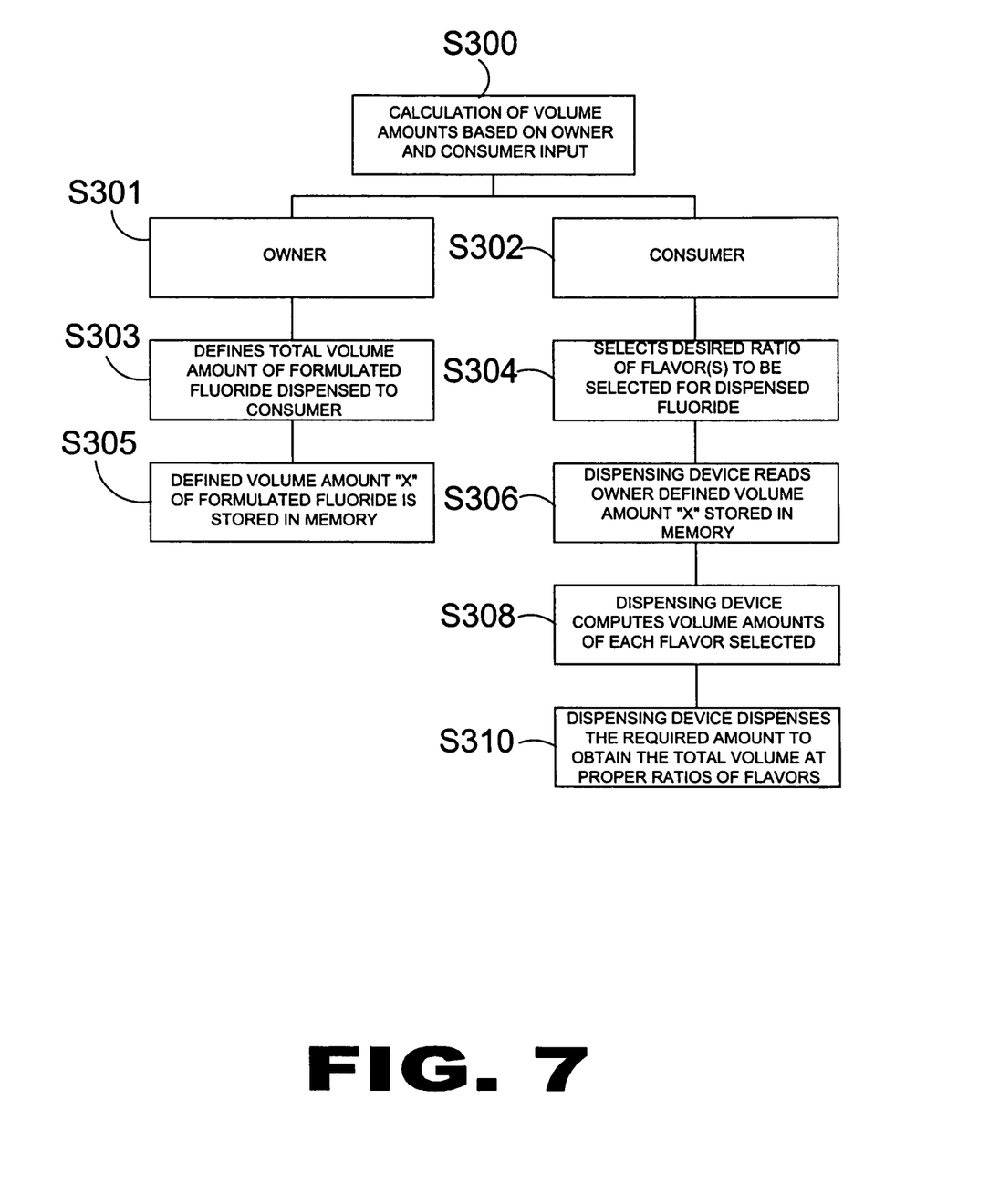
FIG. 7 is a flow diagram showing the volume processing for the fluoride dispensing device of the present invention.

FIG. 7 is a flow diagram showing the volume processing for the fluoride dispensing device of the present invention. The volume processing for the fluoride-dispensing includes the processing requirements and/or computation used in determining the dispensed volume for at least one of individual fluoride flavors and unique mixed fluoride combination. The present invention's fluoride-dispensing device provides means to formulate and dispense custom flavored fluoride to a user/patient. Step S300 begins the calculation of volume amounts based on inputs by both the owner and the consumer. The owner inputs are shown in step S301 and includes defining the total volume amount of formulated fluoride dispensed to the consumer, as in step S303. Thereafter in step S305, the defined total volume of formulated fluoride is then stored in memory.

The calculation of step S300 further continues with consumer inputs as shown in step S302. The consumer must first select the ratio of desired flavors that are selected to be dispensed by the fluoride dispenser as shown in step S304. The dispensing device then proceeds in step S306 to read the owner defined volume amount that is stored in memory. With that information the dispensing device can compute in required in step S308, the volume amounts of each respective flavor selected by the user. Thereafter, the dispensing device dispenses the required amounts of each respective selected flavor to obtain the total volume at proper ratios of flavors, as in step S310.

Figure 8:
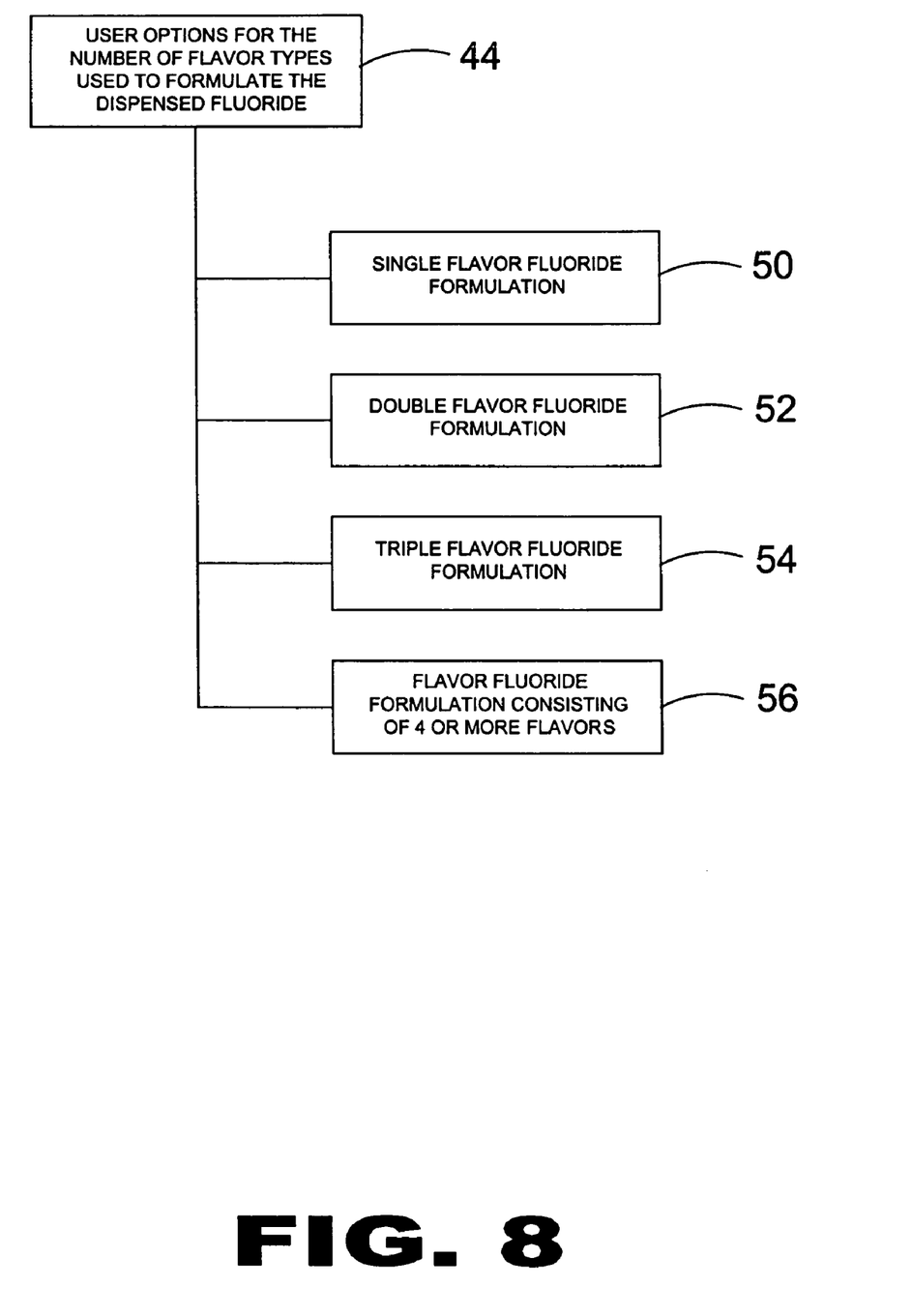
FIG. 8 is a block diagram illustrating consumer input options for choosing fluoride flavors for dispensing by the fluoride dispensing device of the present invention.

FIG. 8 is a block diagram illustrating consumer input 44 options for choosing fluoride flavors for dispensing by the fluoride dispensing device of the present invention. The consumer input options 44 for the fluoride dispensing device allow the consumer a plurality of selection options in choosing the number of flavors to be included with the final fluoride formulation. A first option, is a single flavor fluoride formulation 50. A second option is a double flavor fluoride formulation 52. A third option is a triple flavor fluoride formulation 54 and a final is a flavor fluoride formulation consisting of 4 or more flavors 56.

Figure 9:
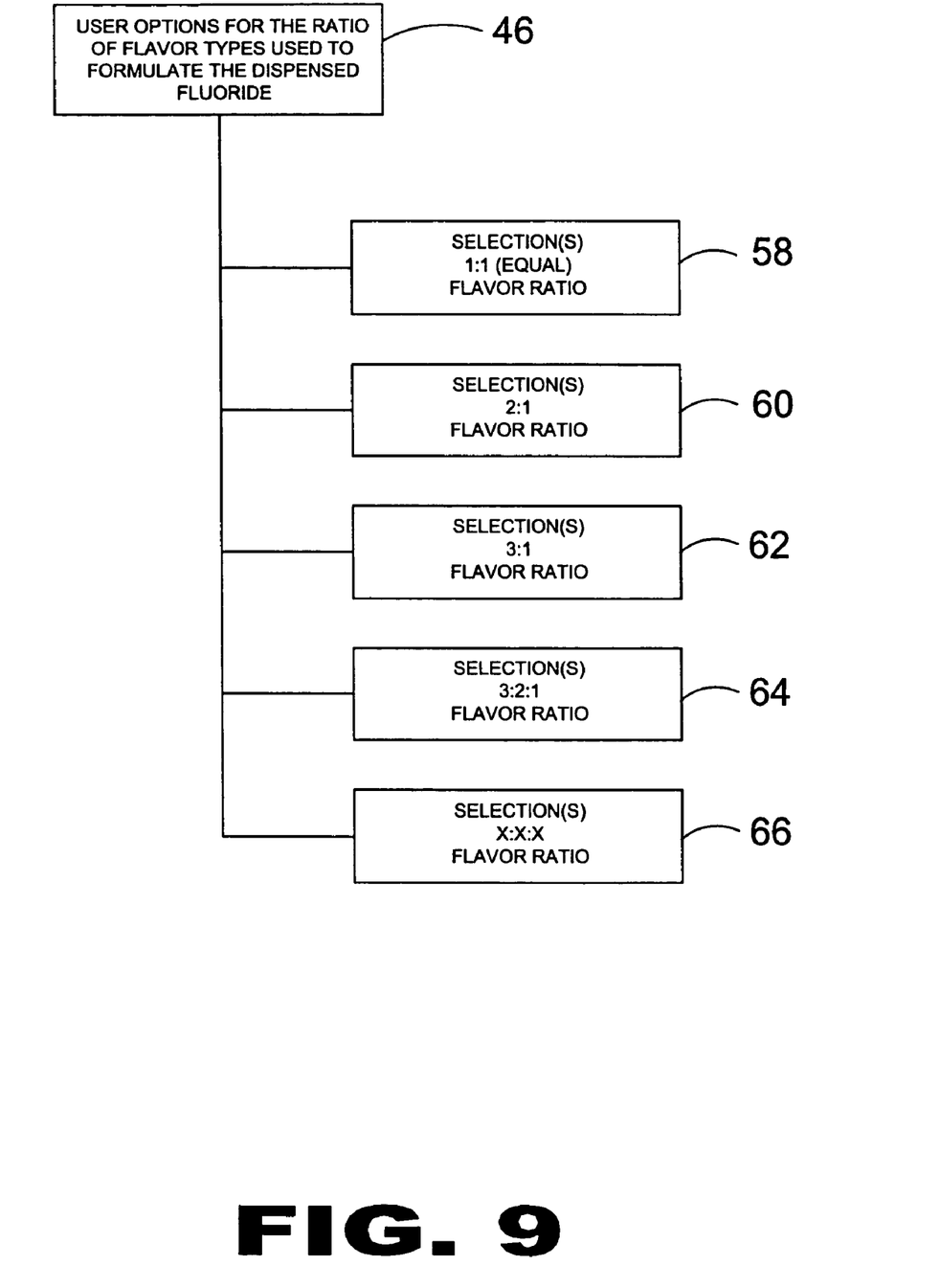
FIG. 9 is a block diagram illustrating consumer input options for choosing fluoride flavor ratios for the fluoride dispensing device of the present invention.

FIG. 9 is a block diagram illustrating consumer input options for choosing fluoride flavor ratios for the fluoride dispensing device of the present invention. Shown herein is the ratio selector 46 which provides a plurality of selection option in choosing the volume ratio of each flavor to be included in the final fluoride formulation. A first option included in the ratio selector 46 is a 1:1 equal ratio 58 of two different fluoride flavors. A second option is a 2:1 flavor ratio 60 of two different fluoride flavors. A third option is a 3:1 flavor ratio 63 of two different fluoride flavors. The fourth option is a 3:2:1 flavor ratio of three different fluoride flavors and the final option is a user selectable ratio 66 wherein the user can selectively chose the ratio of at least three different fluoride flavors to be used in the final fluoride formulation. Additionally, the user defined ratio 66 allows a user to selectively choose the ratio of any number of fluoride flavors selected by the fluoride selector 44 as described hereinabove with specific reference to FIG. 8.

Figure 10:
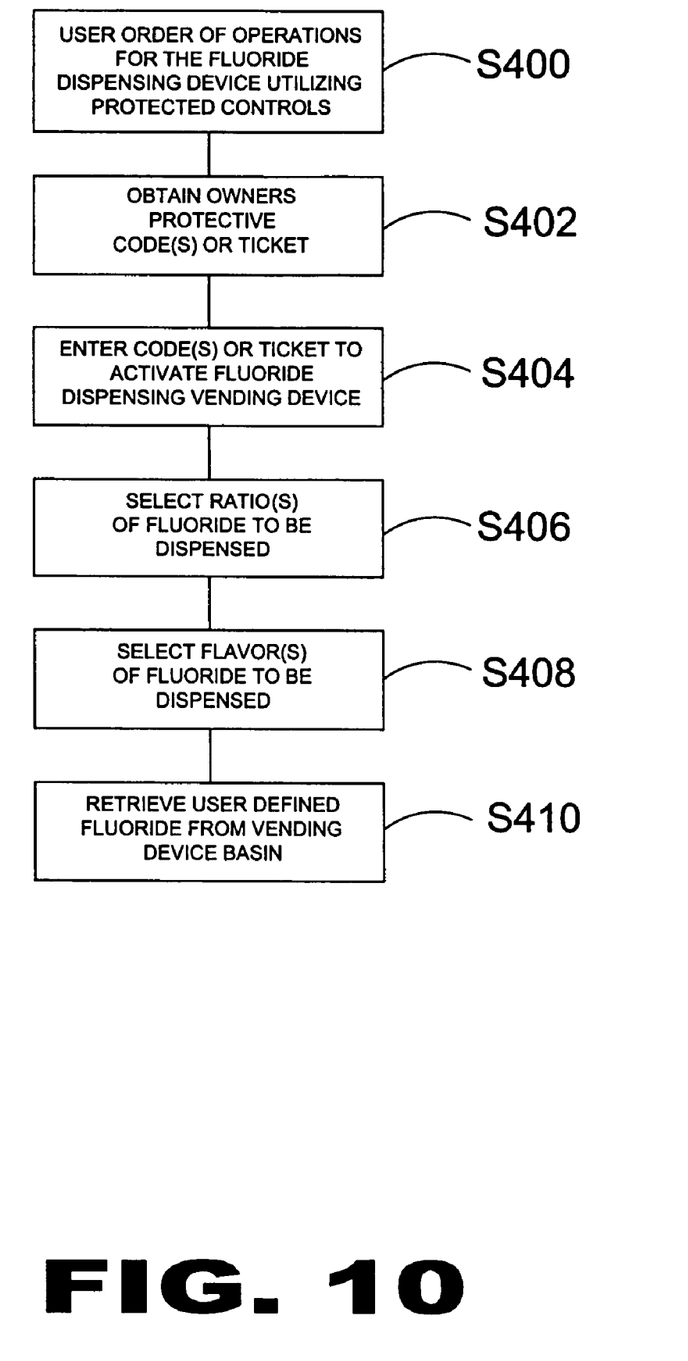
FIG. 10 is a block diagram illustrating consumer input options for the fluoride dispensing device of the present invention with restricted access.

FIG. 10 is a flow diagram illustrating consumer input options for the fluoride dispensing device of the present invention with restricted access. FIG. 10 contemplates that the fluoride dispensing device 10 of the present invention includes a security feature to prevent unauthorized use of the dispensing device by requiring a user to obtain an access code(s) and/or ticket.

A user begins at step S400 to access the fluoride dispenser 10 of the present invention using protected controls. First, the user obtains from the owner at least one of a code(s) and ticket, as in step S402. The user must enter the at least one of code(s) and ticket to activate the fluoride dispensing machine 10 as in step S 404. Once activated, the user can select the ratio(s) of fluoride to be dispensed as shown in step S406 and described hereinabove with specific reference to FIG. 9. Upon setting the ratio in step S 406, the user then selects the flavor(s) of fluoride to be dispensed, as in step S408. In the final step S410 the user retrieves the user defined fluoride from the retrieval basin.

Figure 11:
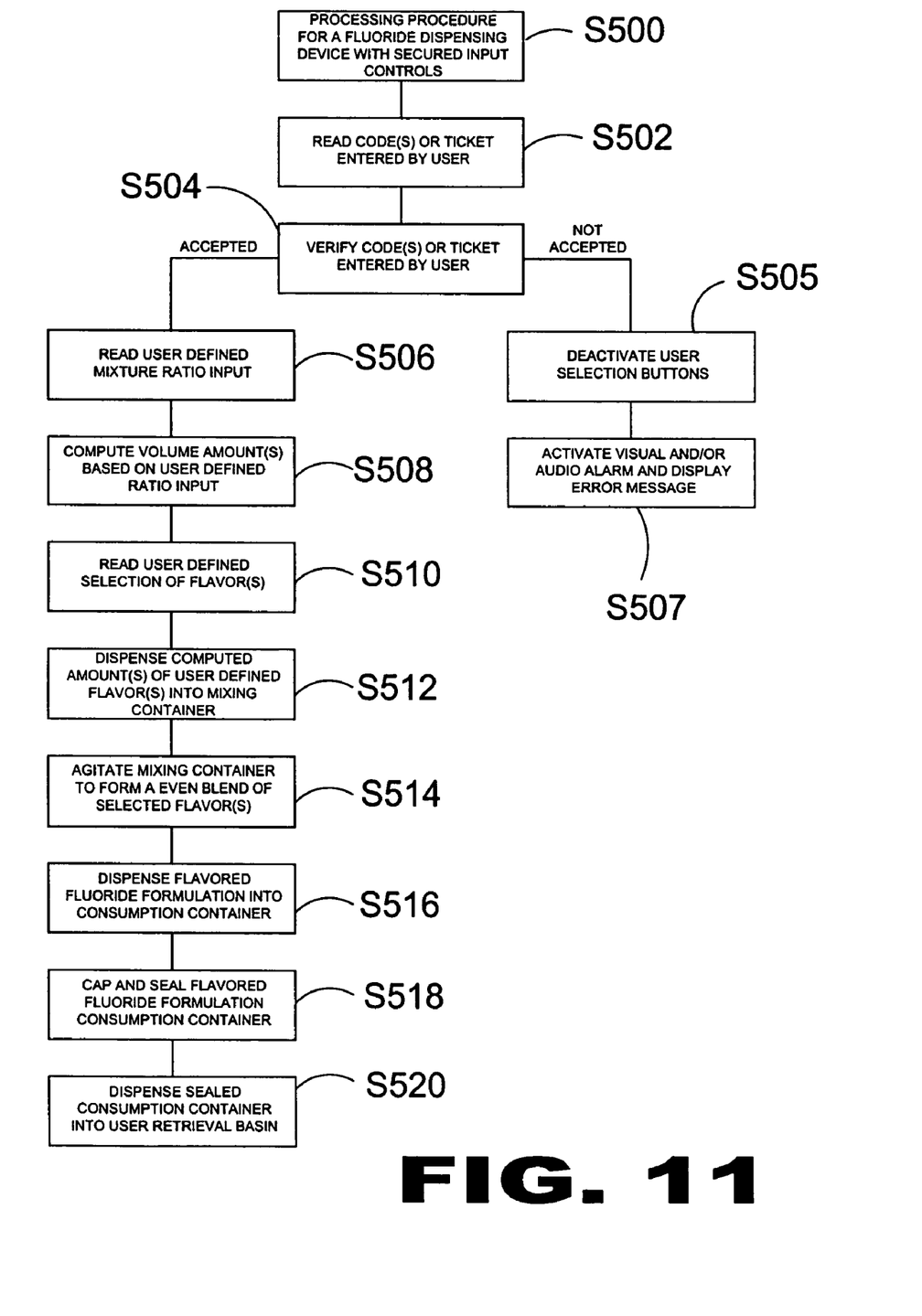
FIG. 11 is a flow diagram illustrating the processing procedure for the fluoride dispensing device of the present invention with an additional element.

FIG. 11 is a flow diagram illustrating the processing procedure for the fluoride dispensing device of the present invention with an additional element. The process for a fluoride dispensing device with secured input controls begins at step S500. In step S502, the at least one of code(s) and ticket entered by the user is read by the dispenser 10 of the present invention. Once entered, the system must verify the at least one of code(s) and ticket entered by the user, as in step S504.

If the at least one of code(s) and ticket entered by the user is not accepted by the system, then the system deactivates the user selected buttons, as in step S505 and also activates at least one of a visual, audio alarm and displays an error message on a display as in step S507.

If the at least one of code(s) and ticket is accepted then the system proceeds to read the user defined ratio input as in step S506. Once the ratio input is obtained, the volume amount(s) of fluoride to be used is computed, as shown in step S508. Then in step S510, the user defined selection of flavor(s) is read by the system. A mixing container is then filled with the computed amounts of user defined fluoride flavors, as in step S512. After being filled in step S512, the mixing container is agitated to form an even blend of the selected flavors, as shown in step S514. The flavored fluoride formulation is then dispensed in step S516 into the consumption container and the consumption container is capped and sealed in step S518. The consumption container is then dispensed in the retrieval basin for retrieval by a user as in step S520.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An apparatus for allowing a dental patient to formulate his own flavored fluoride at a point of use comprising:
    a) a free standing housing having a storage container for separately storing a plurality of different flavored fluoride treatments, a mixing container for mixing and agitating a plurality of selected flavored fluoride treatments, a dispensing mechanism, a mixing bay with an opening in a front wall of said housing, and a receiving bay under said mixing bay;
    b) an input device for receiving an authorization code issued by an owner of said apparatus for a dental patient to gain access using said authorization code to said apparatus and to input options for formulating a custom flavored fluoride from one or more of stored fluoride treatments in said storage container;
    c) means in response to said input for formulating a selected flavored fluoride treatment from said stored fluoride treatments;
    d) means for entering a volume amount of said desired flavored fluoride to be dispensed;
    e) means for dispensing said formulated desired fluoride treatment in said volume amount after mixing and agitating in said mixing container into a consumption container, capping and sealing said consumption container within said mixing bay, said consumption container being positioned behind a protective screen covering said front opening of said mixing bay to prevent interference and/or contamination of contents during mixing and dispensing process; and
    f) means in said housing for transferring said sealed consumption container from said mixing bay to said pickup bay for retrieval by said patient, said pickup bay having a front opening for allowing said patient to reach into said pickup bay to retrieve the capped and sealed consumption container.

2. The apparatus as recited in claim 1, wherein said formulating means includes a ratio selector for selecting a first amount of a first flavored fluoride treatment with respect to a second amount of a second flavored fluoride treatment for use in formulating said desired flavored fluoride treatment.

3. The apparatus as recited in claim 2, wherein said mixing container includes an agitator for agitating said mixing container having said plurality of different flavored fluoride treatments contained therein causing said desired flavored fluoride treatment to be uniformly mixed.

4. The apparatus as recited in claim 3, wherein said authorization includes an access card and access card reader, wherein a user obtains said access card and inserts said card in said reader thereby obtaining access to said apparatus.

5. An apparatus for allowing a dental patient to formulate his own flavored fluoride at a point of use comprising:
    a) a free standing, self-contained housing having a storage container for separately storing a plurality of different flavored fluoride treatments, a mixing container for containing and agitating therein a plurality of selected flavored fluoride treatments, a dispensing mechanism for dispensing the mixed fluoride treatments into a consumption container including means for capping and sealing said consumption container within a mixing bay with an opening in a front wall of said housing for viewing the dispensing, capping and sealing of the consumption container, and a receiving bay under said mixing bay for pickup of said capped and sealed consumption container by a dental patient;
    b) a front wall of said housing having a selector panel, said opening displaying said dispensing mechanism and consumption container, said opening being covered by a transparent window, and another opening into said pickup bay, said front wall being hinged on one side for opening and closing, with a lock on an opposite side of said front wall;
    c) said selector panel being an input device for receiving an authorization code issued by an owner of said apparatus for said dental patient to gain access to said apparatus and to input a desired flavored fluoride treatment from said stored fluoride treatments in said storage container;
    c) means in response to said input for formulating said desired flavored fluoride treatment from said stored fluoride treatments;
    d) said selector panel having means for entering a volume amount of said desired flavored fluoride to be dispensed and transferring the desired flavored fluoride to said mixing container;
    e) means in said housing for dispensing said formulated desired fluoride treatment in said volume amount from said mixing container into said consumption container and sealing said consumption container in said mixing bay behind a transparent protective screen over the front opening to prevent interference or contamination of contents, and for storing in a memory the desired fluoride treatment for said dental patient; and f) means for transferring said sealed consumption container from said mixing bay to said pickup bay for pickup by said patient.

6. A method in which a dental patient formulates his own flavored fluoride at a point of use comprising the steps of:
   a) placing in a dental environment a patient operated dispenser of customized selected flavored fluoride treatments, said dispenser comprising a free standing housing having a storage container for separately storing a plurality of different flavored fluoride treatments, a mixing container for mixing and agitating a plurality of selected flavored fluoride treatments to produce a selected formulated flavored treatment, a dispensing mechanism in a mixing bay having a front opening with a transparent cover to prevent interference and/or contamination, and a receiving bay;
   b) a dental practitioner inputting into said housing an authorization code for a dental patient to gain access to said apparatus and to input options for formulating a custom flavored fluoride from one or more of the stored fluoride treatments in said storage container;
   c) said dental patient inputting said authorization code to allow access to said dispenser;
   d) said dental patient inputting a desired flavored fluoride treatment made from said stored fluoride treatments;
   e) said dispenser dispensing said selected desired fluoride treatment after mixing and agitating in said mixing container the selected stored fluoride treatment into a consumption container, capping and sealing said consumption container within said mixing bay and storing in a memory the desired fluoride treatment selected by said dental patient;
   f) said sealed consumption container being transferred from said mixing bay to said pickup bay for retrieval by said dental patient; and
   g) said dental patient receiving a fluoride treatment using the dispensed desired flavored fluoride treatment.

7. The method of claim 6 in which selection buttons are inactivated and an alarm is sounded in the event the dental patient inputs an incorrect authorization code.

* * * * *